United States Patent
Lee et al.

(10) Patent No.: US 6,545,091 B1
(45) Date of Patent: Apr. 8, 2003

(54) ADHESIVE COMPOSITIONS BASED ON BLENDS OF GRAFTED METALLOCENE CATALYZED AND NON-GRAFTED CONVENTIONAL POLYETHYLENES

(75) Inventors: I-Hwa Lee, Wilmington, DE (US); Barry A. Morris, Wilmington, DE (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 1216 days.

(21) Appl. No.: 08/591,330

(22) Filed: Jan. 25, 1996

(51) Int. Cl.[7] ............................ C08L 33/02; C08L 51/00
(52) U.S. Cl. ..................................................... 525/78
(58) Field of Search ........................................... 525/78

(56) References Cited

U.S. PATENT DOCUMENTS

| | | | |
|---|---|---|---|
| 3,868,443 A | 2/1975 | Bartz et al. .................. 525/78 |
| 4,684,576 A | 8/1987 | Tabor et al. ................ 428/441 |
| 5,272,236 A | 12/1993 | Lai et al. .................. 526/348.5 |
| 5,278,272 A | 1/1994 | Lai et al. .................. 526/348.5 |
| 5,346,963 A | 9/1994 | Hughes et al. ............... 525/285 |
| 5,708,080 A | 1/1998 | Tsutsui et al. ................ 525/74 |

*Primary Examiner*—Patrick D. Niland
(74) *Attorney, Agent, or Firm*—Kevin S. Dobson

(57) ABSTRACT

Polyethylene-based adhesive compositions which contain as little as 5 weight percent, and up to 35 weight percent of an acid-grafted metallocene polyethylene have superior peel strength to comparable compositions containing an acid grafted non-metallocene polyethylene. Compositions where the acid-grafted metallocene polyethylene component is based on a metallocene polyethylene having a melt-flow ratio of less than 6.53 and an Mw/Mn of greater than the melt flow ratio less 4.63 are as good adhesive compositions as those based on metallocene resins falling outside these parameters.

8 Claims, No Drawings

ADHESIVE COMPOSITIONS BASED ON BLENDS OF GRAFTED METALLOCENE CATALYZED AND NON-GRAFTED CONVENTIONAL POLYETHYLENES

BACKGROUND OF THE INVENTION

1. Field of the Invention

This invention relates to adhesive compositions, particularly co-extrudable adhesives, suitable for composite structures, such as those having both barrier and structural layers. The adhesive compositions are blends of acid-grafted metallocene catalyzed polyethylenes and conventional-linear polyethylene homopolymer or copolymer or low density polyethylene.

2. Discussion of Related Art

Co-extrudable adhesives based on blends of various polyethylenes which also contain an acid-grafted polyolefin to aid in adhesion to polar layers are well known.

U.S. Pat. No. 3,868,433 (Bartz et al) discloses polyolefins generally, graft-modified with acids, and which may also contain elastomers, for use as hot-melt adhesives.

U.S. Pat. No. 4,684,576 (Tabor et al) discloses adhesive blends based on acid-grafted high density polyethylene, and linear low density polyethylene of density 0.88 to 0.935.

Known adhesives containing various polyethylenes and acid-grafted polyethylenes employ polyethylenes which are conventional-linear polyethylenes such as high-density polyethylene homopolymer (conventional-HDPE), and linear low density polyethylene copolymer (conventional-LLDPE), as well as low density polyethylene (high pressure, free-radical or LDPE).

In recent years, polyethylenes have been developed which are made using 'single-site' or 'metallocene' catalysts. These polyethylenes are dramatically more uniform in various composition related respects. They compare with conventional-HDPE and conventional-LLDPE in that they are essentially linear, containing either no or only a modest amount of long-chain branching, unlike free-radical LDPE which contains large amounts of long-chain branching. In addition, other than the catalysts employed, they can be prepared in ways similar to conventional-HDPE and conventional-LLDPE. They may contain an alpha-olefin comonomer which provides short-chain branching as in conventional-LLDPE.

The catalysts provide uniformity in various ways. The molecular weight distribution is narrow compared with that of conventional-HDPE and conventional-LLDPE. Furthermore, in alpha-olefin copolymers, the comonomer is introduced in a far more uniform way, both along any given chain and from chain to chain, so that the so-called short-chain branching distribution is narrow.

Long-chain branching in all polymers, including polyethylenes, changes their melt rheological behavior, typically making their flow more non-Newtonian over a large range of shear. Broader molecular weight distribution (MWD), without any branching, also increases non-Newtonian behavior. In LDPE, long-chain branching and broad MWD combine to provide considerable non-Newtonian behavior. Here however, long-chain branching per se, in addition to the nature of the polymerization, causes a broadening of the MWD, so that long-chain branching, broad MWD, and non-Newtonian rheology are inextricably intertwined. In certain metallocene polyethylenes, it has been found possible to have a small amount of long-chain branching which, because of its uniform positioning along the polymer chains and from chain to chain, allows the MWD to remain narrow, yet provides considerable non-Newtonian behavior. The narrow MWD provides, in general, superior properties, and the non-Newtonian behavior provides, in general, superior processability. Such long-chain branching is not necessarily present in metallocene polyethylenes however, and such metallocene polyethylenes are generally more Newtonian in their rheological behavior.

U.S. Pat. No. 5,272,236 (Lai et al.) and its continuation-in-part U.S. Pat. No. 5,278,272 (also Lai et al.) disclose metallocene polyethylene homopolymers and copolymers which have a small amount of controlled long-chain branching which causes advantageous rheology, but without broadening MWD. The amount of branching is from 0.1 to 3 long-chain branches (lcbs) per 1000 chain carbon atoms. These polyethylenes with this deliberate, small amount of long-chain branching are referred to, in a logical 'tour de force' as 'substantially linear'. (The first of these two patents, allows for 'unsubstituted' non-branched polymer as being within the definition of substantially linear, i.e., it also includes from 0 to 0.1 lcbs per 1000 chain carbon atoms). In these two patents, long-chain branching is described as being due to carbon side chains of 'at least 6 carbon atoms'. The long-chain branching is produced by certain polymerization conditions, and not by any added polymerizable species.

Short-chain branching, also uniformly positioned along the chain, can be introduced by C3–C20 alpha-olefins as well as certain acetylenically unsaturated and diolefin monomers. In practice the comonomer in metallocene polymers is typically butene or hexene, as in Exxon EXACT (TM) resins and octene in Dow AFFINITY (TM) and ENGAGE (TM) resins. Also used are propylene and butadiene in more elastomeric versions of metallocene polyolefin based resins. The amount of comonomer may be up to at least 30 mole percent, and these levels change the density of the polyethylenes in a comparable way to the change in density from conventional-HDPE through conventional-LLDPE, to the so-called very low density polyethylene with high comonomer content, (conventional-VLDPE) and finally to elastomers, usually with very high comonomer content.

In the above two patents, octene is typically the comonomer. Though octene will produce a side chain of 6 carbon atoms, and is introduced at a mole percent level of at least 5 percent, it is apparently not counted as a long-chain branch, despite their definition of long-chain branch. Long-chain branching appears only to refer to polymerization-produced and not comonomer-introduced branches.

These so-called 'substantially linear' metallocene polyethylenes as in the above two patents, which have been grafted with acid comonomers such as maleic anhydride are the subject of U.S. Pat. No. 5,346,963 (Hughes et al.) After grafting the advantageous MWD and non-Newtonian rheology and good melt flow of the before-grafting metallocene resins are disclosed as remaining intact, unlike grafting on conventional polyethylenes, which, according to the above patent, can cause poor rheology. The grafted resins are disclosed as being advantageous in compatibilizing various thermoplastics including olefin and non-olefin polymers, as well as in compatibilizing filler and matrix in particulate-filled resins. Blends which include blends with (non-grafted) conventional polyethylenes and LDPE, non-grafted substantially linear polyethylenes, as well as a vast range including many ethylene copolymers such as EVOH, EVA and many non-ethylene polymers, are disclosed as being extrudable into shaped articles. The grafted substantially linear polyethylenes are disclosed as being useful when made into a film 'comprising up to 100 % of the graft polymer'. These films exhibit desirable adhesive properties and are useful as tie layers in tying, for instance, polyethylene to EVOH. For adhesive use, there is no mention of blending with non-grafted conventional polyethylenes, only with non-grafted substantially linear polyethylenes, presumably because the poorer properties of conventional polyethylenes would be assumed to dominate. The films described and tested are prepared from 100% of the grafted substantially linear resins. Heat-seal tests described show such films seal better to polypropylene, polyamide and polycarbonate, but seal to EVOH about equally well as grafted conventional-linear polyethylene does.

There remains a continuing need for inexpensive adhesives which contain a substantial and major portion of relatively inexpensive conventional-linear polyethylenes and/or LDPE, which possess superior properties to prior art conventional-linear and/or LDPE polyethylene based adhesives.

SUMMARY OF THE INVENTION

The invention depends on the discovery that even a small amount,—as little as 5 percent, and generally no more than 35 percent—of acid-grafted metallocene polyethylenes, when used in otherwise conventional-linear polyethylene and/or LDPE based adhesives compositions, can produce markedly superior adhesives compared with similar adhesive compositions but which contain comparable levels of acid-grafted conventional-linear polyethylene and/or acid grafted LDPE.

Another aspect of the invention, depends on the further discovery that the acid-grafted metallocene resins in the improved adhesive compositions do not need to be based on the so-called 'substantially linear' polyethylenes, i.e., those rheologically modified by low levels of long-chain branching, in order to manifest superior properties to those employing an acid-grafted conventional-linear polyethylene and/acid grafted LDPE in the composition.

Specifically, there is provided an adhesive composition, comprising a blend of:
 a) a polyethylene selected from the group consisting of conventional-HDPE, conventional-LLDPE, conventional-VLDPE, LDPE and a blend of any of these four,
 b) from 5 to 35 weight percent, based on the total blend of a) plus b) plus c), of an acid-grafted metallocene polyethylene, the before-grafting metallocene polyethylene selected from the group consisting of (i) those having a melt flow ratio of less than 6.53 and an Mw/Mn ratio of greater than the melt flow minus 4.63, and (ii) those having a melt flow ratio of equal or greater than 6.13, and an Mw/Mn ratio of equal or less than the melt flow ratio minus 4.63.
 c) optionally up to 30 percent of a polyolefin elastomer, the acid grafting agent being an unsaturated carboxylic acid or its derivative, and the level of grafting being such that the total amount of grafting agent is 0.01 to 3 weight percent based on the total composition, a) plus b) plus c).

There is particularly provided the adhesive composition as above, but where the acid-grafted metallocene polyethylene is within the flow ratio and Mw/Mn ratio limits (i).

A further aspect of the invention are composite structures in the form of sheets, bottles, metal composites, and particularly multilayer films, having at least two layers, wherein at least two of the at least two layers are adhered together with an adhesive composition having the above composition. The layers may be co-extruded or laminated.

DETAILED DESCRIPTION OF THE INVENTION

The density distinguishing abbreviations HDPE, LLDPE, VLDPE or ULDPE, are used for 'linear' as distinct from highly branched (short and long chain) LDPE made by free-radical polymerization. Originally, before the advent of metallocene catalysts, the terms referred to resins made using Ziegler-Natta type catalysis. However, the terms are now often also used for resins made by metallocene catalysis as well. In this disclosure, resins made by Ziegler-Natta type catalysis will be referred to as conventional-HDPE, conventional-LLDPE, conventional-VLDPE to avoid confusion. Density ranges differ in the literature. For such conventional-linear resins, the density ranges used here will be: conventional-HDPE greater than 0.935, conventional-LLDPE from greater than 0.91 to 0.935, conventional-VLDPE from 0.85 to 0.91. Conventional-VLDPE is sometimes included as a subset in the category conventional-LLDPE, the density range for the latter going down to 0.85. To avoid confusion, resin at or below 0.91 will always be referred to as VLDPE. For metallocene resins, the above abbreviations will not be used, the actual density or density range being specifically referred to where needed. The word conventional will be reserved for linear resins and implies a linear resin made by Ziegler-Natta catalysts, and thus is not used to qualify LDPE. LDPE in this disclosure is free radical polyethylene having a density from 0.91 to 0.935.

Metallocene resins which form the basis of the acid-grafted metallocene resins of this invention, can be considered as being divided into two groups. The two groups are based on two readily measurable parameters, the melt flow ratio and the Mw/Mn ratio. The first group are those metallocene resins which contain either no or very low (as distinct from a small amount of) long-chain branching, and are thus more truly linear. The second group of the before-grafting metallocene resins are those which are believed to contain a small amount of long-chain branching. This group corresponds roughly, but not precisely to those, using the same terminology as in U.S. Pat. No. 5,278,272, noted above, which are referred to as 'substantially linear'. As previously suggested, this usage may seem at odds with the essential nature of the resins, namely that they contain a small amount of long-chain branching. The term 'substantially linear' will not be used in relation to the metallocene resins of the present invention, because there appears to be a certain ambiguity in the term as discussed below. The specific distinction, for the purposes of this invention, is made, not on the amount of long-chain branching, but using specific values for two measurable parameters combined: the melt flow ratio I-10/I-2, and the molecular weight distribution, as measured by the ratio of the moments of the distribution Mw/Mn.

The 'substantially linear' metallocene resin disclosed in the above-mentioned '272 patent, is one which is stated to have from 0.01 to 3 lcbs per 1000 chain carbon atoms, long-chain branching being a branch of 'at least about 6 carbon atoms'. Metallocene resins with less than this level from 0 to 0.01 lcbs per 1000 chain atoms are included in the term 'substantially linear' in the '236 patent above, but not in the '272 patent. It is because of this ambiguity that the term will not be used in relation to the before-grafting metallocene resins of the present invention. The level of branching to which these are stated to pertain to are noted here to provide some perspective only. The distinction used between the two groups of metallocene polyethylenes which are acid grafted is, for the purposes of this invention, based solely on the melt-flow ratio and Mw/Mn ratio, because these are readily measurable parameters, and not on the level of long-chain branching, even though the parameters which distinguish the two groups of this invention are believed to correspond approximately to the two levels of long-chain branching noted. Low levels of long-chain branching such as 0.01 are more difficult to measure, and thus would represent a parameter which could not be rigorously ascertained. Furthermore, when octene, having a side chain length of 6 units, is the comonomer it is not clear to what extent this would interfere with measurement of long-chain branching. Further again, different length long chain branches will have different effects of the rheology, very long chain branches presumably having greater effect. Therefore, to distinguish resins merely by a numerical value of lcb, without reference to the branch length distribution is of limited value. By contrast, specifically measurable parameters of melt flow ratio, and Mw/Mn ratio are precise, irrespective of the underlying molecular structure to which they correspond.

The two groups of acid-grafted metallocene resins for the purposes of this invention are (i) those based on ungrafted metallocene resins which have an I-10/I-2 ratio of less than 6.53 together with an Mw/Mn of greater than (I-10/I-2)−4.63, and (ii) those based on ungrafted metallocene resins which have an I-10/I-2 ratio of equal or greater than 6.13 and an Mw/Mn ratio of equal or less than (I-10/I-2)−4.63. While the latter group allows for Mw/Mn of less than 1.5, generally the Mw/Mn will be greater than this. These ungrafted resins are the 'before-grafting' metallocene resins of the present invention. The latter ratio is also one parameter used in defining for claim purposes, the resins of U.S. Pat. No. 5,287,272. The two ungrafted metallocene resins are mutually exclusive. A resin with an I-10/I-2 of 6.23 will fall into the former category if its Mw/Mn is greater than 1.6 and the latter category if its Mw/Mn is 1.6 or less. In the above patent, in addition to the limitation that Mw/Mn should be equal or less than (I-10/I-2)−4.63, I-10/I-2 could be equal or greater than 5.63 rather than the limitation of the present invention which is 6.13.

Thus the first group of ungrafted metallocene resins which form the base resin for the acid grafted resins of the present invention falls outside the resins of the '272 patent, while the second group falls within, but is more restricted than those of the patent. Conventional-linear polyethylenes have I-10/I-2 values and Mw/Mn values which would generally not fall within either of these groups based on their I-10/I-2 and Mw/Mn values.

After grafting, the Mw/Mn ratio values remains low, but the ratios defining the resin before grafting are not necessarily maintained and the ratios can be expected to change somewhat. The acid-grafted metallocene resins of U.S. Pat. No. 5,346,963 (Hughes) are based on ungrafted metallocene resins as defined in the '272 patent. The acid-grafted resins which form up to 35 percent of the adhesive compositions of the present invention thus includes acid grafted resins of the Hughes patent. However, the major portion of the compositions of the present invention are not metallocene resins.

The three types of conventional-linear resins discussed above can be prepared by well known Ziegler-Natta methods (e.g., U.S. Pat. No 4,076,698 and U.S. Pat. No. 3,645, 992); catalysis in solution, slurry, gas phase, or on a support. Metallocene resins may be made using conditions well known in the prior art for continuous polymerization, Ziegler-Natta or Kaminsky-Sinn type polymerization reactions. That is to say, temperatures from 0 to 250° C., and pressures from atmospheric to 1000 atmospheres (100 MPa). Suspension, solution, slurry, gas phase or other process conditions may be employed if desired. A support may be employed, but preferably the catalysts are used in a homogeneous (i.e., soluble) manner. Suitable conditions and catalysts which can produce substantially linear metallocene resins are described in U.S. Pat. No. 5,278,272, which is hereby fully incorporated by reference. The reference gives full descriptions of the measurement of the well-known rheological parameters I-10 and I-2, which are flow values under different load and hence shear conditions. It also provides details of measurements of the well-known Mw/Mn ratio determination, as determined by gel-permeation chromatography (GPC). Ungrafted metallocene resins which can form the basis for the grafted resins of the present invention are also described in U.S. Pat. Nos. 5,198,401 and 5,405,922 which are also hereby fully incorporated by reference.

Surprisingly, although the superior properties of metallocene resins and acid-grafted metallocene resins depend on the narrow molecular weight distribution and, for copolymers, on the uniformity of short-chain branching both along chains and from chain to chain, it has been found that these resins can undergo major dilution with conventional linear polyethylenes and LDPE, and optionally elastomer. The adhesive compositions of this invention need have only 5 to 35 weight percent, preferably less than 30 weight percent, and most preferably less than about 25 weight percent of acid-grafted metallocene resins. This means that 65 to 95 weight percent of the compositions have none of the supposed attractive attributes of metallocene resins, yet the overall compositions display a major improvement in adhesiveness compared with compositions containing acid-grafted non-metallocene resins. The 65 percent which is non-grafted resin is conventional-linear polyethylene or LDPE, or a mix of these, except that up to 30 weight percent of the non-grafted portion may be a hydrocarbon elastomer.

The resins of the non-grafted portion which conventional-linear polyethylene and/or LDPE and optionally elastomer will generally have a broad molecular weight distribution, and this will dominate in blends, so that the blend compositions will also have a broad molecular weight distribution. In conventional linear copolymers, the short-chain branching of the comonomer will not be uniform, and there will be species, particularly low molecular weight species with well above average levels of comonomer. In blends one might expect the 'inferior' qualities of the (non-metallocene) non-grafted major portion of the compositions to dominate. Nevertheless, in the adhesive compositions of the invention, the presence of as little as 5 weight percent acid-grafted metallocene resins will produce improvements in adhesive qualities. It has been clearly demonstrated that levels from 8 to 19 percent acid-grafted metallocene resins produce very significant improvements.

Even more surprisingly, despite the supposed advantages of acid-grafted metallocene polyethylenes of category (ii) above, (which are generally within the acid-grafted metallocene resins of the Hughes patent), it has been discovered that the acid-grafted metallocene resins of category (i) above, (those based on non-grafted resins having an Mw/Mn of greater than (I-10/I-2)−4.63 and an I-10/I-2 of less than 6.53) are generally just as advantageous in the blend compositions of the present invention as the acid-grafted metallocene resins of the Hughes invention. Use of these low levels of (acid-grafted) metallocene resin in otherwise non-metallocene resin polyolefin based adhesive compositions has an additional cost advantage over use of 100 percent metallocene resin, since currently these resins are relatively expensive.

All or part of the metallocene polyethylene is graft-modified with an unsaturated carboxylic acid or its derivatives. Acid grafting agents which are suitable are acrylic acid, methacrylic acid, fumaric acid, maleic acid, nadic acid, citraconic acid, itaconic acid, and anhydrides, metal salts, esters amides or imides of the above acids, and the like. The preferred grafting agents are maleic acid and maleic anhydride, especially the latter. The method of grafting onto the metallocene polyethylene can be any of the processes well known in the art. For example, grafting can be carried out in the melt without a solvent, as disclosed in European Patent Application No. 0,266,994, or in solution or dispersion or in a fluidized bed. Melt grafting can be done in a heated extruder, a Brabender® or a Banbury® mixer or other internal mixers or kneading machines, roll mills and the like. The grafting may be carried out in the presence or absence of a radical initiator such as a suitable organic peroxide, organic perester, or organic hydroperoxide. The grafted polymers are recovered by any method which separates or utilizes the graft polymer that is formed. Thus, the graft polymer can be recovered in the form of precipitated fluff, pellets, powders and the like.

In grafting the metallocene resin, all the molecules of metallocene may have an acid graft or grafts, or grafting may be only partial, in the sense that at least some free metallocene polyethylene molecules may remain. With grafting of this sort, there will always be some uncertainty as to whether substantially every polymer molecule will have at least one grafted acid moiety or not, particularly at low levels of grafting. If not every molecule becomes acid grafted, this is equivalent to a mix of a grafted metallocene having all molecules grafted and ungrafted metallocene resin. However, the art of grafting uniformly is well known, and the acid-grafted resin should be as uniformly grafted as possible. The limits in the adhesive composition are that the total amount of grafted metallocene resin, whether or not completely grafted, be equal or less than 35 weight percent. The use of the phrase '5–35 weight percent of an acid-grafted metallocene resin' is to be understood in this context. The amount of graft on the metallocene resin is such that the total composition of the adhesive contains from 0.005 to 5 weight percent, preferably 0.01 to 3 weight percent, more preferably 0.03 to 0.5 weight percent, and most preferably from 0.05 to 0.25. The amount of grafting in the total composition is very important. It is within the skill of the artisan to achieve satisfactory uniformity of the grafting for any given level of total grafting.

The density of the metallocene resin to be grafted can be from 0.85 to 0.96 g/cc. It can be homopolymer or copolymer. These densities corresponds to a level of comonomer similar, but not identical to that which would produce the same density in conventional-linear polyethylenes. In conventional-linear resins these densities correspond to, from homopolymer HDPE to VLDPE but the metallocene resins incorporated in the compositions of this invention are not referred to in those terms since the borderline between a particular property type in conventional and metallocene resins will not be exactly the same. Metallocene elastomer olefin copolymers will also be suitable. The lower density corresponds to more than 30 weight percent comonomer, but depends on the comonomer, and these limits can include elastomers. The comonomer can be an alpha olefin containing from 3 to 20 carbons, preferably 3 to 12 and most preferably from 3 to 8. Examples include propylene, 1-butene, 1-hexene, 4-methyl-1-pentene, 1-octene, and 1-decene. Propylene, 1-hexene, 1-butene and 1-octene are preferred. The density of several suitable copolymers and the amounts of which comonomer they contain are shown in Table 1.

The melt index (MI), as measured according to ASTM D-1238, at 190° C. using a load of 2.16 kg. (the conditions of the I-2 measurement), of the grafted metal locene copolymer can be from about 0.1 to about 50, preferably about 0.3 to about 40. It should be understood that the acid-grafted metallocene polyethylene can be a mix of more than one MI and a mix of graft levels and from more than one starting (i.e., ungrafted) metallocene resins.

The remains of the adhesive composition is ungrafted conventional-linear polyethylene, which may be conventional-HDPE, conventional-LLDPE, conventional-VLDPE, or LDPE, as defined above, or mixes of these, and optionally up to about 30 weight percent of a hydrocarbon elastomer. Many comparable adhesive compositions where the graft resin is acid-grafted conventional-linear homopolymer or copolymer polyethylene or acid-grafted LDPE are well known in the art.

The density of the final adhesive blend composition may be from about 0.88 to 0.96 g/cc., though, as indicated, the component densities of either the metallocene resin from which the grafted metallocene resin is made, or the remaining ungrafted polyethylene portion may range anywhere from 0.85 to 0.97 g/cc. Just as polyethylenes of different density tend to have a distinct commercial market, adhesive compositions of differing final density may have a different market. For instance, higher density adhesives may be more useful for higher temperature end uses or high moisture barrier end uses. Adhesive compositions with a lower overall density will, in general, show higher peel strengths at ambient temperatures than higher density compositions. In order to achieve a given density adhesive, it is obvious that any number of mixes of different density components is possible. With the large number of possible components, their amounts, and differing levels of grafting in the overall composition, it can be difficult to define a meaningful comparison composition. However, one can reasonably compare metallocene resin-containing, and non-metallocene resin-containing compositions with comparable overall final density, and comparable overall levels of acid-grafting agent in the composition and comparable density of the grafted resin. The density of the acid-grafted resin, for instance, can be quite critical to properties.

A (non-grafted) hydrocarbon elastomer is optionally a component of the adhesive. Such elastomers are well known as optional components in non-metallocene resin-containing polyethylene based adhesives. The elastomers are preferably uncured, particularly when the final compositions are to be readily melt-extrudable.

The definition of elastomer is somewhat vague. Thus there can be a continuum in (uncured) ethylene/alpha olefin copolymer elastomers all the way from so-called VLDPE to highly elastomeric copolymers. For the purposes of this invention, a hydrocarbon elastomer is defined as one with sufficiently low crystallinity to have a heat of fusion below about 30 joules/gram. For most elastomers the heat of fusion will be below 10 joules/gram, and many will have no measurable heat of fusion at all.

The hydrocarbon elastomer may be a copolymer of ethylene and one or more alpha-olefins selected from the group consisting of propylene, butene-1, pentene-1, hexene-1, octene-1, 4-methylpentene-1, 1,4-butadiene and 1,4-hexadiene. Examples of such elastomers would be ethylene propylene rubber, ethylene propylene diene rubber (EPDM), and ethylene propylene norbornene rubber. The elastomer may also be styrene-butadiene thermoplastic rubber and styrene-isoprene thermoplastic rubber. Less preferably small amounts of a crosslinked rubber are possible, such as butyl rubber or polyisobutylene. The elastomer will generally be made using conventional catalysts using methods well known in the art. However, elastomers made using metallocene catalysts are not excluded.

EXAMPLES

The adhesive blend compositions in the following examples were prepared by dry blending the ingredients together in a polyethylene bag, and subsequently melt blending in a 30 mm. Werner Pfleiderer (TM) twin-screw extruder. Melt temperature was typically 225 to 250° C.

The adhesive blend compositions were co-extruded between a layer of conventional-HDPE of MI 0.45 g/10 minutes, and a layer of ethylene/vinyl alcohol (EVOH) containing 32 mole % ethylene and a melt index of 1.6 g/10 min. The adhesive blends were melted at 214° C. in a 25 mm. single screw extruder operating at 56 rpm. The EVOH was melted at 231° C. in a 25 mm single screw extruder operating at 42 rpm. All three melt streams were fed through a Brampton (TM) co-extrusion blown film die so as to form a three layer film with the HDPE at 38 microns, the adhesive layer at 14 microns and the EVOH layer at 22 microns. The die temperature was 230° C. The blow-up ratio of the blown film, defined as they lay flat width of the film bubble divided by the diameter of the die opening, was 3.25. (Blow-up ratio is sometimes defined in terms of final bubble diameter rather than lay flat ratio. By this definition, the ratio would be 2.1) The film was run at 4.3 to 4.6 m/minute through the take-up rolls.

The multilayer structures so prepared were evaluated by measuring their peel strengths using ASTM D-1876-72, except that the test used only 3 duplicates of each sample rather than the specified 10. The test speed is 12 inches per minute (0.305 m/minute).

The adhesive compositions of this invention are most suited to be used as co-extrudable adhesives. However other adhesive forms are not excluded, including, for instance, powder-spray coating adhesives. The adhesive compositions are particularly useful for use in multi-layer packaging films, where one or more layers is a barrier to either oxygen or water, or both. Such layers include EVOH, polyamides, polyesters, polyolefins, polystyrenes, ionomers etc. The adhesives will also be useful for bonding to metals such as steel, aluminum, copper and can be used in pipe coating applications where the adhesive is used to coat a polyolefin layer onto a layer of epoxy resin.

Melt flow ratio, I-10/I-2 is measured using ASTM D-1238,

TABLE 1

COMPOSITION AND PROPERTIES OF POLYETHYLENE ADHESIVE BLENDS

| | Grafted Polyethylene | | | | | | | | | Elastomer | | Blend | | |
|---|---|---|---|---|---|---|---|---|---|---|---|---|---|---|
| | | base resin | | graft | | | Non-grafted Polyethylenes | | | | | | wt. % | | peel |
| EX # | code | MI; | density | MI; | % MAN | wt % | codes | density | MI | wt. % | code | wt % | MAH | density | strength |
| 1 | G1-M | 2.2; | .887 | 5.7; | .83 | 15 | LL1 | .92 | 1.4 | 85 | | | .124 | .915 | 190 |
| 2 | G1-M | " | " | " | " | 15 | LL1 | " | " | 80 | | | .124 | .913 | 346 |
| | | | | | | | VL1 | .884 | 0.8 | 5 | | | | | |
| 3 | G2-M | 2.2; | .887 | 3.4; | 1.45 | 8 | LL1 | .92 | 1.4 | 92 | | | .118 | .917 | 417 |
| 4 | G2-M | " | " | " | " | 8 | LL1 | " | " | 80 | | | .118 | .913 | 474 |
| | | | | | | | VL1 | .884 | 0.8 | 12 | | | | | |
| C1 | G8-C | .80; | .884 | 6.0; | .90 | 13 | LL1 | .92 | 1.4 | 87 | | | .117 | .915 | 86 |
| C2 | G8-C | " | " | " | " | 13 | LL1 | " | " | 80 | | | .117 | .913 | 168 |
| | | | | | | | VL1 | 0.884 | 0.8 | 7 | | | | | |
| 5 | G13-M | 1.6; | .899 | 2.3; | 1.02 | 12 | LL2 | .92 | 5.0 | 88 | | | .122 | .917 | 361 |
| C3 | G9-C | 12; | .895 | 28; | .70 | 12 | LL1 | .92 | 1.4 | 88 | | | .084 | .917 | 53 |
| 6 | G4-M | .50; | .868 | 3.2; | .78 | 15 | LL1 | " | " | 85 | | | .117 | .912 | 486 |
| 7 | G4-M | " | " | " | " | 19 | LL2 | .92 | 5.0 | 71 | | | .148 | .906 | 147 |
| | | | | | | | VL1 | .884 | .80 | 10 | | | | | |
| 8 | G4-M | .50; | .868 | 3.2; | .78 | 19 | LL2 | .92 | 5.0 | 61 | | | .148 | .902 | 666 |
| | | | | | | | VL1 | .884 | .80 | 20 | | | | | |
| 9 | G4-M | " | " | " | " | 8 | LL2 | .92 | 5.0 | 79 | EL1 | 13 | .062 | | 260 |
| 10 | G4-M | " | " | " | " | 19 | LL2 | " | " | 76 | EL1 | 5 | .148 | | 445 |
| 11 | G4-M | " | " | " | " | 19 | LL2 | " | " | 61 | EL1 | 20 | .148 | | 1338 |
| C4 | G12-C | EPDM | .87 | 2.0 | 2.0 | 6 | LL1 | .92 | 1.4 | 94 | | | .12 | .917 | 47 |
| C5 | G12-C | " | " | " | " | 8.5 | LL2 | .92 | 5.0 | 74.5 | | | .17 | .909 | 113 |
| | | | | | | | VL1 | .884 | .80 | 17 | | | | | |
| C6 | G12-C | " | " | " | " | 8.5 | LL2 | .92 | 5.0 | 86.5 | EL1 | 5 | .17 | | 37 |
| 12 | G3-M | 1.0 | .902 | 3.5 | .98 | 12 | LL1 | .92 | 1.4 | 88 | | | .118 | .917 | 393 |
| 13 | G3-M | " | " | " | " | 12 | LL1 | " | " | 76 | | | .118 | .913 | 450 |
| | | | | | | | VL1 | .884 | .80 | 12 | | | | | |
| C7 | G5-C | 1.0 | .907 | 9.6 | .90 | 13 | LL1 | .92 | 1.4 | 87 | | | .117 | .918 | 104 |
| C8 | G6-C | 1.0 | .907 | 2.5 | 1.0 | 12 | LL1 | " | " | 88 | | | .12 | .918 | 313 |
| C9 | G7-C | 1.0 | .907 | 4.9 | .90 | 13 | LL1 | " | " | 87 | | | .117 | .918 | 126 |
| 14 | G1-M | 2.2 | .887 | 5.7 | .83 | 15 | LD1 | .915 | 15 | 85 | | | .124 | .911 | 449 |
| 15 | G2-M | 2.2 | .887 | 3.4 | 1.45 | 8 | LD1 | " | " | 92 | | | .116 | .913 | 216 |
| C10 | G8-C | .80 | .884 | 6.0 | .90 | 13 | LD1 | " | " | 87 | | | .117 | .911 | 159 |
| 16 | G3-M | 1.0 | .902 | 3.5 | .98 | 12 | LD1 | " | " | 88 | | | .118 | .913 | 275 |
| C11 | G5-C | 1.0 | .907 | 9.6 | .90 | 13 | LD1 | " | " | 87 | | | .117 | .914 | 148 |

TABLE 1-continued

COMPOSITION AND PROPERTIES OF POLYETHYLENE ADHESIVE BLENDS

| | | Grafted Polyethylene | | | | | Non-grafted Polyethylenes | | | Elastomer | | Blend | | |
|---|---|---|---|---|---|---|---|---|---|---|---|---|---|---|
| | | base resin | | graft | | | | | | | | wt. % | | peel |
| EX # | code | MI; | density | MI; | % MAN | wt % | codes | density | MI | wt. % | code | wt % | MAH | density | strength |
| C12 | G6-C | 1.0 | .907 | 2.5 | 1.0 | 12 | LD1 | " | " | 88 | | | .12 | .914 | 216 |
| 17 | G4-M | .50 | .868 | 3.2 | .78 | 15 | LD1 | " | " | 85 | | | .117 | .908 | 454 |
| C13 | G12-C | | .87 | 2.0 | 2.0 | 6 | LD1 | " | " | 94 | | | .12 | .912 | 72 |
| 18 | G5-M | 2.5 | .935 | 3.0 | 1.01 | 14.9 | LL1 | .920 | 1.4 | 85.1 | | | .15 | .922 | 628 |
| 19 | G6-M | 16.5 | .895 | 9.6 | .90 | 15.6 | LL1 | .920 | 1.4 | 84.4 | | | .12 | .916 | 452 |

Codes
LL1 is conventional-LLDPE, 7 wt. % (3.5 mole %) butene comonomer mfg. by Novacor.
LL2 is conventional-LLDPE, — with same comonomer/content, with different MI
VL1 is conventional-VLDPE, 23 wt. % (13 mole %) butene comonomer mfg. by Union Carbide.
LD1 is LDPE.
MAN is maleic anhydride.
G = grafted resin, -M = metallocene type base resin, -C suffix = conventional linear type base resin.
C prefix is an example shown for comparative purposes.
G1-M Graft onto resin with 19.5 wt. % (10.8 mole %) butene comonomer mfg. by Exxon. Corp; I-10/I-2 = 5.64, Mw/Mn = 1.9
G2-M Graft onto resin with same comonomer/content, but different graft MI and graft level I-10/I-2 = 5.64, Mw/Mn = 1.9
G3-M Graft onto resin with 13 wt. % (3.5 mole %) octene comonomer mfg. by Dow Chem. I-10/I-2 = 8.62, Mw/Mn = 2.2
G4-M Graft onto resin with 25 wt. % (7.6 mole %) octene comonomer, elastomer, mfg. by Dow Chem.; I-10/I-2 = 7.81, Mw/Mn = 2.0
G5-M Graft onto resin with 3 wt. % octene comonomer, mfg. by Dow Chem. I-10/I-2 = 9.71, Mw/Mn = 2.0
G6-M Graft onto resin with 21 wt. % hexene (8.1 mole %) mfg. by Exxon. Corp I-10/I-2 = 6.09, Mw/Mn = 2.0
G5-C Graft onto resin with 12 wt. % (6.4 mole %) butene comonomer mfg. by Union Carbide I-10/I-2 = 7.85, Mw/Mn = 3.5
G6-C Graft onto resin with same comonomer/content but different graft MI and graft level I-10/I-2 = 7.85, Mw/Mn = 3.5
G7-C Graft onto resin with same comonomer/content but different graft MI and graft level I-10/I-2 = 7.85, Mw/Mn = 3.5
G8-C Graft onto resin with 23 wt. % (13 mole %) butene comonomer mfg by Union Carbide I-10/I-2 = 8.77, Mw/Mn = 3.9
G9-C Graft onto resin which is an ethylene/propylene/butene copolymer, 4/14 wt. % comonomers, (11.4 total mole %) mfg by Enichem.
G12-C Graft onto resin which is an EPDM elastomer containing 67 weight percent ethylene, grafted as indicated.
G13-M Graft onto resin with 16 wt. % (4.5 mole %) octene comonomer base. I-10/I-2 = 9.89, Mw/Mn = 2.1
EL1 is an EPDM elastomer with 70 wt. % ethylene, and Mooney viscosity 21.
Blend density is calculated, as a weighted average based on percent and density of components.
Note that
G1-M, G2-M and have Mw/Mn > (I-10/I-2) — 4.63 and I-10/I-2 of less than 6.53 (i.e., group (i) in the claims)
G3-M, G4-M, G5-M and G13-M have Mw/Mn < or = I-10/I-2 — 4.63 and I-10/I-2 greater than 6.13 (i.e., group (ii) in the claims)

The data in Table 1 demonstrate that, for compositions varying in various ways such as (i) density of the grafted resin, (ii) net graft level of the composition, (iii) net density of the composition, (iv) MI of the graft resin or of the base resin before grafting, (v) MI of the non-graft component or components, (vi) whether a C4, C6 or C8 comonomer, and (v) comparable non-metallocene components, use of a grafted metallocene grafted polyethylene at very modest levels provides adhesive compositions with superior peel strength.

Compositions 1 to 4 and C1 and C2 provide a comparison where the grafted resin, (metallocene or non-metallocene) has comparable density in the 0.884–0.887 range. Examples 1 and 3 can be compared with C1 in that the bulk of the composition, the non-grafted component, is the same conventional-LLDPE only. Examples 2 and 4 and C2 have an additional conventional-VLDPE component. It can be seen the compositions with metallocene grafted polyethylene have superior peel strength in all cases. It can be seen that compositions with conventional-VLDPE in them tend to have higher peel strength in all cases, but the use of metallocene graft resin is the dominating factor. The net density and the net graft level in the total composition are shown, and the MI of various components before and after grafting, and of non-grafted components. These are typically factors to be considered in judging adhesive qualities, in that lower overall density and higher graft level generally provide higher peel strength. Examination of the data show clearly that the use of graft-metallocene resin is dominant in producing higher peel strength, and that the variations in net density and net graft level, and the various MIs within the range of these six compositions, does not have a discernible effect. Examination of the MI of the various components suggest that MI is, within the limits tested, not a dominating factor in determining final properties.

The acid-grafted resins in these compositions are grafted metallocene resin, where the before-grafting metallocene resins from which they derive are ethylene/butene copolymers, all of which fall outside the substantially linear category of U.S. Pat. No. 5,278,272. The acid-grafted resin thus also falls outside the limits of the acid-grafted resins of U.S. Pat. No. 5,346,963. Nevertheless, they provide a superior level of adhesion to use of grafted, conventional-linear resins. Furthermore, the level of the acid-grafted metallocene resin is only from 8 to 15 weight percent in the total composition. This means that at least 85 percent of the compositions have all the 'undesirable' qualities attributed to conventional resins with regard to molecular weight distribution and comonomer distribution. It appears that just 8–15 percent of grafted metallocene resin, for these particular compositions, is sufficient to provide superior peel strengths, despite the large portion of conventional-linear resins. Furthermore, while conventional-linear and particularly LDPE resins supposedly have less attractive qualities with regard to molecular weight and comonomer distribution, their melt flow behavior is generally more non-Newtonian, and therefore generally considered more desirable for processing by, for instance, extrusion. (Indeed, that is apparently why controlled branching was introduced into the resins of the above patent—i.e., to achieve the desirable non-Newtonian flow). For compositions which use a large amount of conventional resin in them, it is not necessary to use grafted 'substantially linear' metallocene resins with their desirable rheology to achieve an overall desirable rheology, since the large portion of conventional resin will dominate the rheology. In other words, the large portion of conventional resin provides the desirable rheology, yet a small portion of a metallocene resin is still adequate to provide superior adhesive qualities in the graft composition.

Examples 5 and C3 use grafted polyethylenes, the base resins for which have a somewhat higher density, approaching 0.9. The presence of 12 percent graft metallocene resin gives better peel strength than 12 percent grafted conventional resin. In this case however, the low MI of the conventional resin before and after grafting, together with the low level of net grafting may make this a poor comparison.

Examples 6 through 11 and C4 to C6 use grafted metallocene and conventional resins whose density is lower; in the region of 0.87. All the metallocene resins are grafted octene copolymers, the base octene copolymer falling within the 'substantially linear' category of the '272 patent. The compositions have a range of net graft levels and densities. Some have conventional-VLDPE and some have an elastomer added. While no exactly comparable compositions which utilized metallocene graft and conventional graft resins are listed, it is clear that the grafted metallocene resin containing adhesive compositions are quite superior in peel strength to those which use an acid-grafted conventional resin as the graft component. Even when VLDPE or elastomer is present, as in C5 and C6, in addition to the graft being a grafted EPDM, only very low peel strength values are obtained. Differences in net graft level and net density, can not explain the relatively poor performance when the graft resin component is not a metallocene resin based graft resin.

Examples 12 and 13 and C7 to C9 use grafts based on higher density resins (0.902 and 0.907). Examples 12 and 13 give superior peel strength to the comparative examples.

Examples 14 to 17 and C10 to C13 all incorporate LDPE in the non-grafted portion of the composition. The compositions cover a range of densities for the base component of the graft, as well as octene and butene copolymers as graft base resin. The range of variables is sufficiently wide that it is not easy to make precise comparisons. Nevertheless, it is again clear that using metallocene grafts at a 15 weight percent or lower level provides superior peel strength to those using grafted conventional resins.

Examples 18 uses a grafted relatively high density metallocene resin, while example 19 uses a base metallocene resin which is a hexene copolymer. Both give good peel strength, though no direct comparisons were made.

Overall, the acid-grafted metallocene resins of either of the two categories provide better peel strength adhesive compositions in HDPE/adhesive composition/EVOH laminates than do adhesive compositions containing grafted conventional resins.

We claim:

1. An adhesive composition, comprising:
   a) a non-metallocene generated polyethylene selected from the group consisting of conventional-HDPE, conventional-LLDPE, conventional-VLDPE, LDPE, and a blend of any of these four,
   b) from 5 to 35 weight percent, based on the total weight of a) plus b) plus c), of an acid-grafted metallocene polyethylene of those having a melt flow ratio $I_{10}/I_2$ of less than 6.53 and an Mw/Mn ratio of greater than the melt flow ratio less 4.63, and
   c) optionally up to 30 weight percent of a hydrocarbon elastomer, the acid grafting agent being an unsaturated carboxylic acid or its derivative, selected from the group consisting of acrylic acid, methacrylic acid, fumaric acid, maleic acid, nadic acid, citraconic acid, itaconic acid and anhydrides, metal salts, esters, amides or imides of the above acids and the level of grafting being such that the total amount of grafting agent in the total composition a) plus b) plus c) is from 0.01 to 3 weight percent.

2. The composition of claim 1 wherein b) is less than 30 weight percent of the total composition, and the amount of grafting agent is from 0.05 to 0.25 weight percent of the total composition a) plus b) plus c).

3. The composition of claim 1 wherein b) is less than 20 weight percent of the total composition, and the amount of grafting is from 0.05 to 0.25 weight percent of the total composition a) plus b) plus c).

4. A multilayer composite structure, comprising:
   at least two structural layers, wherein at least two of the at least two layers are adhered together with an adhesive layer having the composition of claim 1.

5. The multilayer structure of claim 4 wherein the adhesive composition is the composition of claim 1.

6. The multilayer structure of claim 4, wherein at least one layer is a barrier layer to oxygen, water, or both.

7. The multilayer structure of claim 6 which is a multilayer film, and wherein the structural and adhesive layers are co-extruded.

8. The multilayer structure of claim 6 wherein the barrier layer is selected from EVOH, polyamide, polyester, polyolefins, polystyrenes or ionomers.

* * * * *